Figure 1:
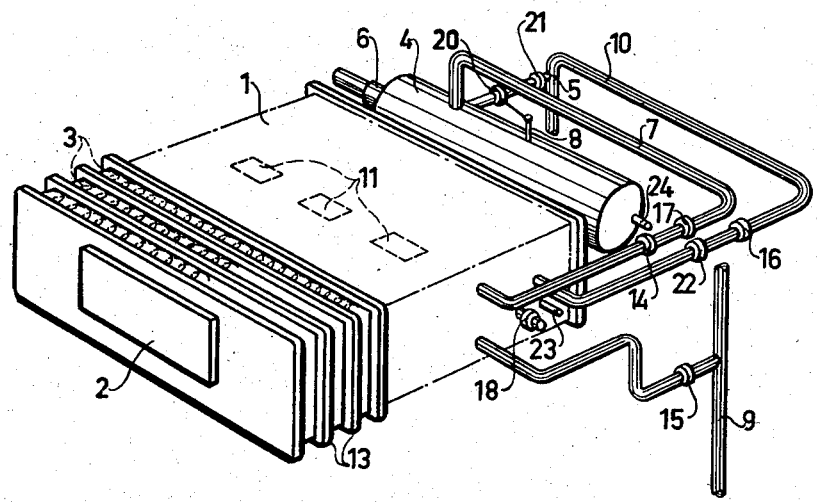

May 5, 1959　　　G. V. LARSON ET AL　　　2,885,294
OVEN AND METHOD OF PREPARING FOOD
Filed Aug. 30, 1954　　　　　　　　　　　2 Sheets-Sheet 1

INVENTORS
Richard Victor Larson
Waino Valdemar Sjoland
BY
James M. Cadle
their ATTORNEY United States Patent Office 2,885,294
Patented May 5, 1959

2,885,294

OVEN AND METHOD OF PREPARING FOOD

Gerhard Victor Larson and Wäinö Valdemar Sjölund, Stockholm, Sweden, assignors to Vict. Th. Engwall & Company, Kommanditbolag, a commandite company of Sweden Application August 30, 1954, Serial No. 453,014

Claims priority, application Sweden September 24, 1953

7 Claims. (Cl. 99—216)

Scientific research made during recent times have brought to common knowledge the fact that in usual methods of preparing food a great deal of the vitamin contents and other nutritional complements present in raw materials and necessary for preserving life and health are subject to extensive destruction. Therefore, it is quite natural that many proposals have been made aiming at preserving said substances in a better manner than with the methods hithertofore practiced.

Since it has been found by experiments that a prolonged heating and the presence of atmospheric oxygen are the most destructive factors influencing the vitamins, in particular vitamin C, and contribute to non-desirable enzymatic changes which deteriorate the characteristic aromatic substances of the foodstuffs, most of the methods proposed for improving the preparation of food have aimed at a rapid boiling, frying or baking process, and at effecting necessary heat treatment in a neutral or indifferent atmosphere.

In the method still most commonly practiced for preparing food, that is "boiling in water," or, in other words, heating the food by means of boiling water at atmospheric pressure into which the foodstuffs are immersed without any protecting cover, there will occur a substantial extraction and/or simultaneous destruction of aromatic compounds, vitamins, enzymes and other biofactors and nutritional salts. In addition, many food-stuffs absorb considerable amounts of the heating medium, such as water, which makes them unappetizing, particularly due to the fact that the raw material loses its original fresh color and consistency. Furthermore, this method calls for a long heating time until the boiling condition aimed at has been completed, that is to say, until the food-stuff has become sufficiently sterilized and soft or tender to be suitable for consumption.

High pressure boiling now widely practiced in which the food-stuff is kept immersed in water and heated in an autoclave to temperatures substantially in excess of 100° C., can be carried out in a shorter time than the "usual" boiling process. In addition to a direct saving in time for preparing the food, a number of other inconveniences involved in the usual boiling process may also be reduced to a certain extent, but the essential drawback remains, namely that the heating water results in a non-desirable soaking of the raw product. Besides this the process is very difficult to carry out—especially for certain kinds of food-stuffs—because if the heating period is extended even slightly too much there will often occur a decomposition or pulping of the product and an impregnation thereof with heating water.

Steam boiling has also been utilized in order thereby to reduce the treatment period and avoid destruction of the delicate substances contained in the raw product. In the methods employing steam as a heating medium the soaking of the raw product will, of course, be considerably less than when boiling in water, whether the latter boiling be carried out as pressure boiling or at the atmospheric pressure. However, high pressure boiling, notwithstanding the fact that many variations thereof have been proposed and tested, has not been estimated nor reached the expected extensive use simply due to the fact that the results aimed at, namely a more rapid boiling procedure and an improved final product, have not been obtained by the employment of such "boiling." Terms such as "steam kitchen" and "steam boiling" have even assumed a bad connotation since the public could never learn to appreciate the taste and consistency of products prepared by steam boiling. Nevertheless, there are many reasons in favor of steam boiling as a means for obtaining a rapid and ideal boiling process.

Steam has a very high heat content which, during the condensation process, is transferred to the food product. The heat content of the steam may be increased further either by superheating of by increasing the pressure. Furthermore, as aforesaid, the soaking of the product resulting from this process is comparatively slight.

These well-known facts are the direct and primary reasons why we decided to choose steam as the heating medium when we turned to the problem of rationalizing the preparation of food. Extensive experiments, however, show that neither saturated low pressure steam, saturated high pressure steam, superheated low pressure steam nor superheated high pressure steam could lead to the result aimed at, when utilized in the conventional way, in which the heating medium is introduced into a chamber within which the objects to be treated are present. After many theoretical considerations and systematically planned experiments the goal was finally reached, namely a heat treatment process which only calls for a minor fraction of the time consumed by ordinary boiling in water, and which will not soak the raw material or deteriorate its consistency and appearance, nor reduce its content of aromatics, vitamins and other biofactors to any extent comparable with boiling in conventional manner.

The solution of the problem might appear to be a simple one, so simple, maybe, that when first considering the same it might seem to be obvious if expressed in the following manner: "The provision of means and steps for heating the object by superheated steam at a super-atmospheric pressure." However, one principal object of the invention resides in ensuring that the pressure of the steam contacting and penetrating into the food-stuff etc. will not only be higher than the atmospheric pressure but that also the temperature of the steam will be higher than that of saturated water vapor at the prevailing pressure. Thus the steam will in fact be superheated.

The main object of the present invention is to perform a heating process of this kind. Thus, one of the novel and characterizing features of the invention resides in the fact that the steam treatment is carried out within a hermetically sealed oven chamber the walls of which—or at least those portions thereof facing the interior of the oven chamber—are heated to a higher temperature than that of the steam introduced into the oven chamber, the pressure of said steam being higher than the atmospheric pressure, as aforesaid. The reason for maintaining the steam pressure higher than the atmospheric pressure is that the steam shall be forced into the object to be heated or into its pores. The reason for superheating the steam, that is to say, imparting thereto a temperature in excess of that of saturated water vapor at the prevailing pressure, is that the steam shall not immediately condense in the superficial layer of the cold object, but shall in fact penetrate in the form of a vapor (thus not in the form of an aqueous condensate) into the interior of the object. Only after such penetration has been effected the steam will condense and emit its great heat content, namely its heat of evaporation.

The oven walls should be made of a heat conducting material and are maintained at a higher temperature than the steam introduced into the oven chamber because the superheating of the steam will have to be effected in part by contact with the said walls and in part by heat radiation therefrom, in order to obtain the desired results according to the invention. It will be seen, that if before entering the oven chamber the steam is heated to a temperature sufficiently high so as to impart the desired degree of superheating to the steam, the result would be that, on one hand, the steam would immediately flow to the large wall surfaces surrounding the oven chamber so as to give off part of its heat content thereto and be transformed into saturated or moist steam, and, on the other hand, vigorous movements would be set up in the oven atmosphere. This, in its turn, could cause undesired deformation of the surface layer of various dishes or foodstuffs. Even if the steam present in the oven chamber is superheated adequately by means of strongly heated radiation elements projecting into the chamber from the oven walls, it would not be possible to obtain a quiet atmosphere and a uniform heat supply comparable to those obtainable by the present invention. As a matter of fact, the heat radiation received by the foodstuff from a series of radiation elements could never wholly uniformly be distributed over the surface of the foodstuff since various portions of the latter will be placed too close to certain radiation elements while other portions will be placed too far away from the elements. Thus, certain portions of the foodstuff will be subjected to perpendicular radiation while other portions will be subjected only to radiation at very acute angles, or even be situated in an area shadowed from radiation. Therefore, according to our invention, the heating surface should be large enough to impart to the steam the necessary degree of superheating without the necessity of heating the surface to such a high temperature that the radiation therefrom will be able to burn the foodstuff at any point thereof. In other words, the heating surface will impart superheating to the steam both by contact and by radiation.

It should be noted that the invention also enables a frying and a baking process superior to those obtainable in previously known methods.

The frying and baking process may be characterized as a continuation of the boiling process. After the completion of the boiling process the treatment may be continued so that the desired frying or baking crust is formed on the foodstuff. According to the invention, this crust may be obtained mainly by direct contact with superheated steam and, to a certain extent, also by radiation from the moderately and uniformly heated oven walls, as distinguished from the conventional methods involving contacting action with a heated heat conducting surface or with strongly heated air or flue gases, and also in contradistinction to the method involving vigorous radiation from highly heated radiation elements.

Thus, the first stage of the frying and baking processes consists in boiling the water present within the foodstuff until the superficial cells of the foodstuff have lost their water content, in part by the condensation process carried out in the interior of the foodstuff and, in part, by the heat radiation from the oven walls. According to the temperatures reached within said cells, in the second stage of the process combustion will occur, then a carbonization and, finally, transformation of the cellular tissues into ashes. Devoid of any external supply of fats, a grilling effect will occur, and in the presence of fats such as butter, margarine, dripping etc., the foodstuff will be subjected to frying. The transfer from the boiling into the frying or baking process in an oven having facilities for creating the conditions characteristic of our present invention is a question which to an essential degree depends on the treatment period. It will be seen, therefore, that the frying or baking process, respectively, generally may be stated to be a continuation of the boiling process.

Any piece of foodstuff placed within the oven will behave in the manner of an individual unit and will follow up its own procedure of treatment independently of any other piece of foodstuff which may be placed within the oven. Thus various foodstuffs will not result in taste contamination since no transfer of aromatics, nutritious salts, etc., will take place which could transmit flavoring substances. This means that foodstuffs of quite different natures such as vegetables, fish, meat, etc., can be treated simultaneously in the oven. During this procedure foodstuffs passing through the boiling process may enter the frying stage rapidly while other foodstuffs will continue their boiling process. Thus it will be possible to carry out complete boiling and frying or baking operations on different kinds of foodstuffs simultaneously within the oven chamber provided that the various kinds of foodstuffs have different preparation periods. In the same way it will be possible to treat one portion of foodstuffs of the same kind for a predetermined period for boiling, and then to remove the same and continue the treatment on the remaining portion until it is completely fried or baked.

In order to further clarify the invention a few prior proposals relating to the steam boiling of foodstuffs will now be referred to.

British patent specification No. 60 of 1898 suggests carrying out boiling by means of superheated steam, but in this case the point of view referred to hereinbefore has not been considered. As a matter of fact, in the known case the steam is subjected to superheating within a helical tube when passing to the oven chamber, but since the oven chamber proper is surrounded by the boiler the walls of the oven chamber will apparently be at a temperature lower than that of the steam supplied. This will cause the steam to condense at the oven walls so that only saturated or moist steam will enter into contact with the foodstuff. Furthermore, it has not been realized either, that the steam would have to be at a super-atmospheric pressure in order to be able to penetrate into the foodstuff, since the pores of the latter are filled with air at atmospheric pressure.

In the specification of British Patent No. 261 of 1909 there is described a boiling process carried out in an inert gas at a low temperature, of the order of 140° F. to 160° F. It is true that steam is stated to be present, and presumably its partial pressure would be lower than that of saturated water vapor at the existing temperature (which means that the steam would be superheated) but under the conditions stated no large proportion of the steam would be able to penetrate into the interior of the foodstuff. In addition, the low temperature would also involve a long-duration process which not only would be costly but also would result in vitamin losses, especially because air is allowed to be present in the process. According to our method the air will be expelled from the oven at an early stage—either by the steam blown in, or, for example, by the aid of a vacuum pump.

U.S. patent specifications 948,149, 1,349,784 and 1,820,325 disclose methods which might seem to have certain features in common with our invention. In carrying out the processes disclosed in these prior specifications the steam used is subjected to "superheating." However, these processes are not carried out in such a manner that the necessary heat in the interior of the foodstuff will be supplied mainly by steam condensing in the interior of the foodstuff, as is the case of our process. Thus, according to the U.S. Patent No. 1,349,784 there is used an oven chamber surrounded by concrete walls, and there is an intentional effort to obtain in one portion of the oven space lower temperatures than in the remaining portion thereof. In this way, however, it is quite impossible to attain the interior steam condensation aimed at and reached in accordance with our invention, for according to the "thermal law of the cold wall" the steam will mainly condense within said cooler section of the oven, and no heat radiation will be effected from the thermally non-conducting, or badly conducting, concrete walls to the steam in order to maintain the latter highly superheated.

In the methods proposed in U.S. patent specifications 948,149 and 1,820,325, heating elements are provided within the steam dwellings (consisting in the first instance of interiorly heated tubing, and in the latter instance of electric heaters). Such elements would impart a certain amount of superheating to the steam, but, on the other hand, the oven chambers are constructed in such a manner that they would not endure any noticeable superatmospheric pressure, and practically no radiation would take place from the chamber walls. Therefore, it will be seen that the improved effect aimed at according to the present invention by no means will be obtained in these prior processes.

The U.S. patent specification No. 862,443 discloses a method of steam preparation of foodstuffs in which the walls of an oven or a heating chamber are heated but in which the steam is produced within a heated water tank placed within the oven. The water surface within this tank is in free or open communication with the oven chamber so that, in accordance with Watt's law, the temperature of the steam within this chamber may not exceed that existing above the water bath. It will thus be seen that the water vapor will be saturated and will condense on the surface of the water bath. No condensation within the interior of the foodstuff will take place. It should be noted that, in accordance with our invention, the steam generator is completely separate from the oven chamber and communicates therewith through a pipe through which steam will be forced continuously into the oven chamber thereby preventing any open communication with the free water surface within the steam generator or boiler.

For carrying out the heat treatment according to the present invention in the form of boiling, grilling, frying and baking of foodstuffs, an oven has been constructed which is equipped with arrangements for supplying steam to the interior of the oven, and with additional arrangements for heating the oven walls to temperatures exceeding that of the steam introduced into the oven. The oven can be sealed hermetically and resist an internal surplus pressure of from, at least, 7 lb./in.$^2$ up to several tens of lb./in.$^2$. The devices for heating the oven walls up to a temperature higher than that of the steam may be placed in the oven walls, or may be arranged on the outside of the oven walls in such a manner that the heat from such devices will be transferred to the oven walls and then conducted therethrough to all parts thereof and radiated from the walls to the vaporous atmosphere in the interior of the oven. Heating of the oven walls may be effected both electrically and by gas burners as well as in other ways. It is a matter of the utmost importance that the walls of the oven be heated to their full extent and that they are caused to emit the desired amount of heat radiation. An essential advantage resides in the fact that no electric wiring, or tubing, etc., for heating purposes need be present within the oven where fats, etc., could be burnt in. The smooth oven walls, on the other hand, will be readily cleaned and will thus be more advantageous from a sanitary point of view. The oven may have a parallelepipedic, cylindrical or any other suitable cross-sectional shape. The parallelepipedic shape has been found in practice to be the most advantageous one. It should be noted that the oven could be used either with or without supply of steam thereto, thus in the latter instance serving as a conventional frying and baking oven. Furthermore, the oven may be equipped with means for generating infra-red rays, or for generating a high-frequency A.C. field, and also in such instances the oven would be operable on the inventive principles, or alternatively, as a mere frying and baking oven. The steam supply for the oven is supplied from an exteriorly disposed boiler interconnected by piping with the interior of the oven. One oven may, of course, have steam supplied to it from an individual boiler to the particular oven, or from a boiler adapted to feed several ovens. Various degrees of vacuum may be effected by means of a vacuum pump disposed exteriorly of the oven and adapted to handle one or several ovens.

By using conventional control devices the heating of the oven may be regulated to any desired temperature. Likewise, the heating of the boiler may be controlled and any desired steam pressure may be obtained.

Figure 2:
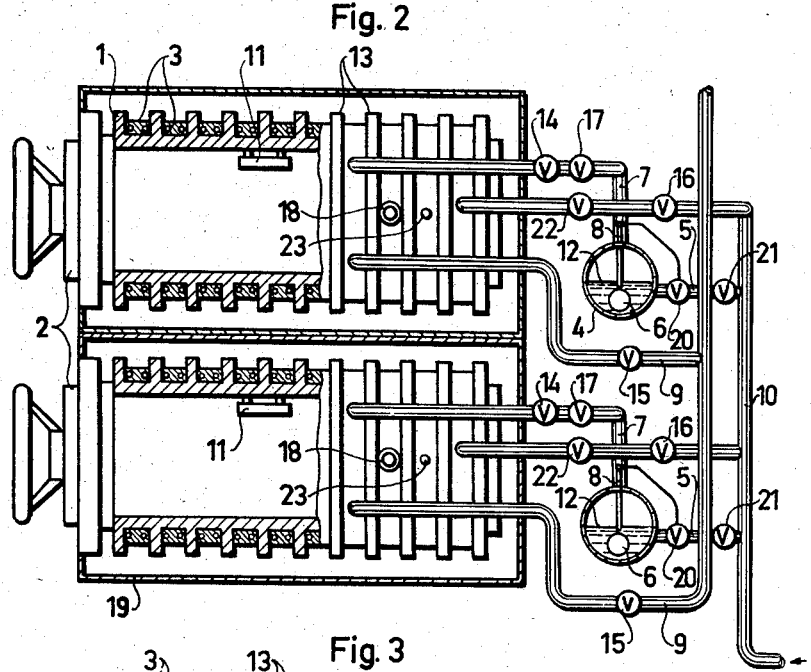
Figure 3:
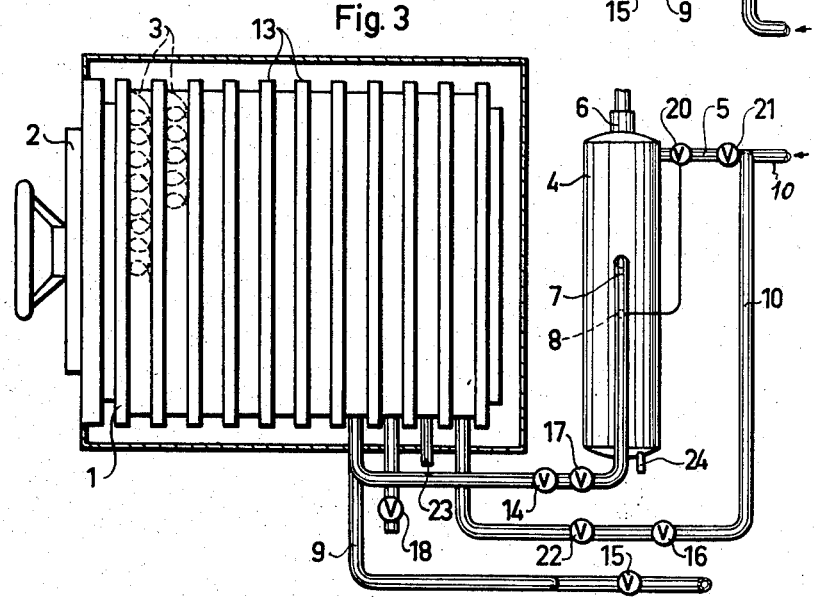

One specific embodiment will now be described more in detail, by way of example, reference being had to the accompanying diagrammatic drawings in which:

Fig. 1 is a perspective view of a section of an oven having its outer casing removed, Fig. 2 is an elevational view of two superimposed oven sections including outer casings, some parts being shown in vertical section, and Fig. 3 is a plan view of Fig. 2.

Referring to the drawings more specifically, numeral 1 designates an oven having, for example, flanges or ribs 13 between which electrical heating elements 3 are disposed for heating the oven. These heating elements could instead be placed within the wall of the oven 1, or within the ribs 13 so as to heat the oven exteriorly up to, for example, 572° F. The oven 1 is provided with a door 2 enabling access to the interior of the oven 1 and adapted to be hermetically closed or sealed. From the boiler 4 in which water 12 is heated, for example by electrical means, such as a cartridge heater 6, steam is supplied into the oven 1 through a steam supply pipe 7 at a pressure of 28.5 lb./in.$^2$ above atmospheric. The water feed to the boiler 4 is controllable in part by means of a valve or cock 20, and in part by level control means 8 and is fed to the boiler from the main water line 10 through branch pipe 5. The steam supply pipe 7 is provided with a steam cock 14 and also with relief valves 17. The water level 12 within the boiler 4 is controlled automatically by valve 20 which is actuated by the level control means 8. Piping 9 serves for evacuation of the oven 1. The piping 9 has a valve 15 for controlling the evacuation. The oven 1 is provided with a relief valve 17 for the steam piping, and with a valve 18 for the oven. The temperature within the oven 1 may be reduced by supplying water thereto through the pipe 10. The amount of water supplied can be regulated by means of water cock 16. Upon steam being formed the oven is subjected to a cooling action. The water supply pipe 5 to the boiler 4 has a non-return valve 21 preventing steam from entering the water pipes. Also the water pipe 10 is provided with a non-return valve 22.

The oven temperature is controlled by a thermostat 23 which controls the electric current supply to the heating elements 3.

The steam pressure within the boiler 4 is controlled by a steam pressure regulator 24 which controls the heating element 6.

Lamps 11 for generating infra-red radiation within the oven 1 may be provided.

The heat treatment of the foodstuffs is carried out in the following manner: The raw materials are cleansed and pre-treated in conventional manner by mixing, seasoning, salting, etc., and are then introduced into the oven to be heat treated. The seasoning, salting etc., however, will have to be materially reduced as compared to the usual practice when preparing foodstuffs in conventional manner. As indicated hereinbefore, no nutritional salts or aromatics are lost in our heat treatment process. The oven is hermetically sealed, and steam is admitted into the oven. In the superheated atmosphere prevailing in the oven and in the absence of atmospheric oxygen, the transfer of the heat of radiation to the atmosphere and the foodstuffs within the oven will take place very quickly. Also the superheated steam will contain no free water droplets tending to obstruct the radiation just mentioned. The foodstuff will present the coldest surfaces within the oven so that the steam will condense in the interior of the foodstuff, at first adjacent to the superficial layer thereof and subsequently at greater depths while transferring heat to the foodstuff which very rapidly will reach the boiling point. Steam leaving the foodstuff will be superheated rapidly and, together with the steam supplied from the steam generator exteriorly of the oven, returned to the interior of the foodstuff. Thus the loss, if any, in weight of the foodstuff will be very slight. As pointed out in the foregoing, it is of importance in order to obtain a rapid penetration of heat into the foodstuff, that the superheated steam possesses a superatmospheric pressure relative to that initially existing within the foodstuff.

It is also possible to effect boiling by combining the steam preparation method described with a vacuum process. In this case the steam supply is disconnected from the oven which then is evacuated. Due to the vacuum pressure obtained within the oven the boiling temperature of the foodstuff placed within the oven will be lowered, and a rapid after-boiling of the water present within the foodstuff will take place. This will, of course, involve removal of water from the foodstuff which may be a desirable effect in respect of certain kinds of foodstuffs. With other kinds of foodstuffs it may be important to effect the boiling process at a lower temperature. This may be effected solely in vacuum at a considerably low temperature.

It is to be noted that the consistency of the foodstuffs, such as meat, fish, or vegetables, etc., may be significant as to the oven temperature and pressure of the steam introduced to be chosen to give optimum results. The extensive possibility of varying the temperatures, pressures and vacuum values enables individual methods of treatment to be applied by cooking specialists in order to arrive at individually tinged results. It would, of course, be possible systematically to group the foodstuffs to be treated, and to state the most suitable average temperature and pressure to be applied, as well as to give directions as to the vacuum treatment.

As will appear from the foregoing, the frying and baking processes may be defined generally as a continuation of the boiling process. The heat radiation from the walls of the oven may be reinforced by using infra-red rays from suitable devices disposed in the interior of the oven. Provision may also be made for creating a high-frequency A.C. field in order thereby further to accelerate the treatments. Both the infra-red radiation and the high-frequency heating may be used either in combination with the steam treatment process or while using the oven as a frying or baking oven. In order to exemplify how the invention is applicable for various temperatures, pressures, etc., in carrying out the boiling, frying and baking processes, reference is made to the accompanying tables. Examples Nos. 1, 2 and 3, respectively.

These examples show, on one hand, that the periods of preparation will be materially reduced when preparing dishes by employing the methods according to the present invention, as compared with the periods necessary when preparing the same dishes in conventional manner, and, on the other hand, that weight, too will be gained. Also, the dishes will be more flavorous and juicy. The meat of, for instance, chicken, will be white and tender. Potatoes will maintain their white color; especially, of course, when white potatoes are used. The meat of fish will remain white and good-tasting and will retain the taste characteristic of each kind of fish. Vegetables, such as peas and beans, etc., will retain their naturally green color, and others, such as cauliflower, etc., their white color. The data stated in the examples may be changed for various dishes and pieces of pastry, by setting the apparatus for various temperatures and steam pressures, or by subjecting the foodstuffs to infra-red radiation or high-frequency electrical heating action, and it will be understood, therefore, that the examples are merely illustrative of the results obtainable at the particular temperature, steam pressure, vacuum value, etc., which has been employed in the test procedures specifically exemplified.

The method according to the invention may be applied to preparation of dishes or food of different kinds, such as meat, fish, shell fish, vegetables, or mixtures, for instance chicken, game, beefsteak, forcemeat, cod, pike, pike-perch, mackerel, sole, lobster, crawfish, potatoes, various kinds of cabbage, onions, leek, spinach, peas, parsnips, artichokes, mushrooms, fruits such as apples and the like.

*Example 1*

| Preparation | Boiling Process | | | Frying Process | | | Prep. time in total min. | Gain in time as comp. with usual prep., min. | Gain in weight as comp. with usual prep., percent |
|---|---|---|---|---|---|---|---|---|---|
| | Oven temp., °F. | Steam press. above atm., lb./in.² | Period, min. | Oven temp., °F. | Vacuum, mm. Hg | Period, min. | | | |
| Chicken | 392 | 14.2 | 8 | | | | 8 | 7 | 12 |
| Do | 392 | 14.2 | 8 | 446 | | 6 | | | |
| Do | | | | | 400 | 2 | 16 | 12 | 8 |
| Roast veal | 410 | 14.2 | 8 | 437 | | 8 | | | |
| Do | | | | | 400 | 2 | 18 | 20 | 15 |
| Forcemeat | 410 | 14.2 | 8 | 437 | | 8 | 16 | 16 | 9 |
| Potatoes | 266 | 8.5 | 8 | | | | 8 | 12 | 10 |
| Leek | 284 | 8.5 | 5 | | | | 6 | 9 | 10 |
| Sugar-peas | 302 | 10.0 | 3 | | | | 3 | 9 | 8 |
| Cauliflower | 257 | 8.5 | 8 | | | | 8 | 7 | 8 |
| Pike-perch | 302 | 14.2 | 5 | | | | 5 | 9 | 9 |
| Sole | 292 | 14.2 | 4 | 437 | | 3 | | | |
| Do | | | | | 300 | 1 | 8 | 9 | 19 |
| Cod | 356 | 11.4 | 6 | | | | 6 | 10 | 11 |
| Mackerel | 320 | 11.4 | 7 | | | | 7 | 6 | 10 |
| Herring | 374 | 14.2 | 5 | 437 | 400 | 4 | 9 | 6 | 14 |

Example II

| Preparation | Boiling Process | | | Frying Process | | | | | Baking process | | |
|---|---|---|---|---|---|---|---|---|---|---|---|
| | 1 | 2 | 3 | 4 | 5 | 6 | 7 | 8 | 9 | 10 | 11 |
| Wiener-bread | 437 | 14.2 | 4 | | | | 437 | 3 | 7 | 4 | 9 |
| Sponge-cake | 392 | 14.2 | 7 | | | | 437 | 5 | 12 | 12 | 14 |
| Do | 437 | 14.2 | 6 | | | | 437 | 5 | 11 | 13 | 15 |
| White bread | 392 | 14.2 | 6 | | | | 437 | 4 | 10 | 6 | 11 |
| Pork-chop | 392 | 14.2 | 5 | 392 | 400 | 4 | | | 9 | 6 | 12 |
| Wh. cabbage | 320 | 12.8 | 15 | 320 | 200 | 2 | | | 17 | 13 | 14 |
| Fowl | 437 | 14.2 | 9 | 437 | | 6 | | | 15 | 10 | 16 |
| Beefsteak | 410 | 14.2 | 10 | 437 | | 8 | | | 18 | 17 | 15 |
| Balt. herring | 392 | 14.2 | 5 | 437 | | 4 | | | 9 | 6 | 11 |
| Peas | 384 | 10.0 | 3 | 284 | 400 | 2 | | | 5 | 8 | 9 |
| Spinach | 284 | 10.0 | 3 | 284 | 400 | 1 | | | 4 | 6 | 7 |

1 = Oven temperature in ° F.
2 = Steam pressure above atm.
3 = Time in minutes.
4 = Oven temperature in ° F.
5 = Vacuum in mm. Hg.
6 = Time in minutes.
7 = Oven temperature in ° F.
8 = Time in minutes.
9 = Total preparation in minutes.
10 = Gain in time as comp. with usual prep. in min.
11 = Gain in weight as comp. with usual prep. in min.

Example III

| Preparation | Boiling Process | | | Frying Process | | | Total prep. time, min. | Gain in time as comp. to usual prep., min. | Gain in weight as comp. to usual prep., percent |
|---|---|---|---|---|---|---|---|---|---|
| | Oven temp., ° F. | Steam press. above atm., lb./in.² | Time, min. | Oven temp., ° F. | Vacuum, mm. Hg | Time, min. | | | |
| Beefsteak | 356 | 14.2 | 4 | 356 | 500 | 3 | 7 | 7 | 6 |
| Beefsteak | 437 | 14.2 | 4 | 437 | | 5 | 9 | 5 | 8 |
| French roll | 464 | 14.2 | 5 | no baking | | | 5 | 10 | 15 |
| Carrots | 302 | 11.4 | 8 | | | | 8 | 7 | 11 |
| Pike-perch | 356 | 10.0 | 4 | 428 | | 5 | 9 | 6 | 12 |
| Plaice | 392 | 11.4 | 3 | 437 | | 2 | | | |
| Do | | | | 437 | 300 | 1 | 6 | 9 | 16 |
| Forcemeat | 428 | 14.2 | 9 | 464 | | 5 | 14 | 17 | 11 |
| Chicken (cock) | 392 | 14.2 | 8 | 446 | | 7 | 15 | 13 | 9 |
| Potatoes | 284 | 10.0 | 9 | | | | 9 | 11 | 11 |
| Potatoes | moist steam | | 2 | | | | | | |
| Potatoes | 284 | 11.4 | 6 | | | | 8 | 12 | 12 |
| Crown artichoke | 302 | 14.2 | 10 | | | | 10 | 10 | 8 |

What we claim is:

1. An oven for preparing food comprising in combination a chamber for receiving said food, means for sealing said chamber from the surrounding atmosphere, means located externally of said chamber for producing steam having a temperature at least as high as the cooking temperature, means for admitting said steam to said chamber, means for superheating said steam so that it will obtain a considerably lower superatmospheric pressure than the pressure of saturated steam at the same temperature, and means for heating the walls of said chamber so as to maintain them at a higher temperature than that of the superheated steam in the chamber in order to prevent condensation of the steam except in the interior of the food.

2. An oven according to claim 1 comprising a source of infrared rays in said oven adjacent to the food to be processed.

3. An oven according to claim 1 comprising means in said oven for producing a high frequency alternating field in the food to be processed.

4. An oven for preparing food comprising in combination a chamber for receiving said food, means for sealing said chamber from the surrounding atmosphere, means located externally of said chamber for producing steam having a temperature at least as high as the cooking temperature, means for admitting said steam to said chamber, means for superheating said steam so that it will obtain a considerably lower superatmospheric pressure than the pressure of saturated steam at the same temperature, and electrical heating elements substantially uniformly spaced along the surface of the walls of said chamber to maintain said walls at a higher temperature than that of the superheated steam in the chamber in order to prevent condensation of the steam except in the interior of the food.

5. A method of preparing food comprising treating the food in a sealed space in an atmosphere of superheated steam of a considerably lower superatmospheric pressure than the pressure of saturated steam at the same temperature, and maintaining the walls confining said space at a temperature exceeding the temperature of said superheated steam so as to maintain the temperature in said space above the condensation temperature except in the interior of the food.

6. The method of claim 5 in which the food is subjected to infra-red rays during processing.

7. The method of claim 5 in which the food is subjected to a high frequency alternating field during processing.

References Cited in the file of this patent
UNITED STATES PATENTS

| | | |
|---|---|---|
| 716,558 | Lacomme | Dec. 23, 1902 |
| 1,226,147 | Trescott | May 15, 1917 |
| 1,380,656 | Lauth | June 7, 1921 |
| 1,702,854 | Simonds | Feb. 19, 1929 |
| 1,934,704 | Golden | Nov. 14, 1933 |
| 2,237,739 | Jones | Apr. 8, 1941 |
| 2,263,866 | Barber | Nov. 25, 1941 |
| 2,339,974 | Austin | Jan. 25, 1944 |
| 2,413,003 | Sherman | Dec. 24, 1946 |
| 2,488,165 | Bowman et al. | Nov. 15, 1949 |

OTHER REFERENCES

"Food," January 1953, pages 4 to 7, inclusive, relied on.